United States Patent [19]

Iizuka

[11] Patent Number: 5,117,711
[45] Date of Patent: Jun. 2, 1992

[54] CONTROL SYSTEM FOR AUTOMOTIVE AUTOMATIC POWER TRANSMISSION WITH FAIL-SAFE OPERATION IN RESPONSE TO FAILURE OF THROTTLE ANGLE SENSOR

[75] Inventor: Naonori Iizuka, Shizuoka, Japan
[73] Assignee: Jatco Corporation, Japan
[21] Appl. No.: 622,796
[22] Filed: Dec. 5, 1990.
[51] Int. Cl.$^5$ ............................................. B60K 41/06
[52] U.S. Cl. ....................................... 74/866; 192/3.3
[58] Field of Search ............................ 74/866; 475/65; 192/3.3

[56] References Cited

U.S. PATENT DOCUMENTS

| | | | |
|---|---|---|---|
| 4,393,732 | 7/1983 | Suzuki et al. | 74/866 |
| 4,618,037 | 10/1986 | Nishikawa et al. | 192/3.3 |
| 4,667,541 | 5/1987 | Shimaoka et al. | 74/866 |
| 4,680,992 | 7/1987 | Hayasaki et al. | 74/866 |
| 4,833,613 | 5/1989 | Mack et al. | 74/866 X |
| 4,849,899 | 7/1989 | Cote et al. | 74/866 X |
| 4,862,362 | 8/1989 | Kurihara et al. | 364/424 |
| 4,922,425 | 5/1990 | Mack et al. | 74/866 X |
| 4,975,844 | 12/1990 | Holbrook et al. | 74/866 X |
| 4,989,702 | 2/1991 | Yoshimura et al. | 475/65 X |
| 5,010,991 | 4/1991 | Tsukamoto et al. | 192/3.3 |

FOREIGN PATENT DOCUMENTS 3036389 4/1981 Fed. Rep. of Germany.
3736070 5/1989 Fed. Rep. of Germany.
62-62047 3/1987 Japan.
63-62656 4/1988 Japan.

OTHER PUBLICATIONS

Service Manual (publication No. A261C07) entitled "Nissan Full Range Electronically Controlled Automatic Transmission RE4R01A Type", published by Nissan Motor Company Limited in Mar. 1987.

*Primary Examiner*—Leslie A. Braun
*Assistant Examiner*—Ryan W. Massey
*Attorney, Agent, or Firm*—Ronald P. Kananen

[57] ABSTRACT

A control system for an automatic power transmission for an automotive vehicle performs line pressure control, shift control, lock-up control, engine brake clutch control, and so forth, on the basis of preselected engine control, parameters including a throttle valve open angle monitored by a throttle angle sensor. The control system is designed to detect failure of the throttle angle sensor or abnormality of the output signal of the throttle angle sensor to perform in a fail-safe mode of operation. In the fail-safe mode of operation, respective ones of a plurality of mutually distinct back-up signals serve as replacement of the throttle angle sensor signal. Each of the back-up signals is adapted to one of line pressure control, shift control, lock-up control, and engine braking clutch control for maintaining acceptable drivability of the vehicle.

10 Claims, 5 Drawing Sheets

| | | C18 | C20 | C22 | C24 | B28 | B26 | OWC 30 | OWC 29 | GEAR RATIO | $\alpha_1 = 0.440$<br>$\alpha_2 = 0.493$ |
|---|---|---|---|---|---|---|---|---|---|---|---|
| D RANGE | 1ST. | | | O | | | | O | O | $\dfrac{1+\alpha_2}{\alpha_2}$ | 3.027 |
| | 2ND. | | | O | O | O | | O | | $\dfrac{\alpha_1+\alpha_2+\alpha_1\alpha_2}{\alpha_2(1+\alpha_1)}$ | 1.619 |
| | 3RD. | | O | O | O | | | O | | 1 | 1.000 |
| | 4TH. | | O | (O) | | O | | | | $\dfrac{1}{1+\alpha_1}$ | 0.694 |
| ENGINE BRAKING STATE | 1ST. | | | (O) | O | | O | (O) | (O) | | |
| | 2ND. | | | (O) | O | O | | (O) | | | |
| | 3RD. | | O | (O) | O | | | (O) | | | |
| | 4TH. | | O | (O) | | O | | | | | |
| REVERSE | | O | | | | | O | | | $-\dfrac{1}{\alpha_1}$ | -2.272 |

( ) NOT EFFECTIVE FOR POWER TRANSMISSION

CONTROL SYSTEM FOR AUTOMOTIVE AUTOMATIC POWER TRANSMISSION WITH FAIL-SAFE OPERATION IN RESPONSE TO FAILURE OF THROTTLE ANGLE SENSOR

BACKGROUND OF THE INVENTION

1. Field of the Invention

The present invention relates generally to a control system for an automatic power transmission for an automotive vehicle. More specifically, the invention relates to an electronic control system for an automotive automatic power transmission, which performs in a fail-safe mode of operation in response to failure of a throttle angle sensor.

2. Description of the Background Art

Japanese Utility Model First (unexamined) Publication (Jikkai) Showa 63-62656 discloses a control system for an automatic power transmission for an automotive vehicle. The disclosed control system is responsive to failure of a throttle angle sensor to perform in a fail-safe mode of operation, in which a line pressure is controlled to a predetermined position irrespective of an actual position of a throttle valve. In the shown system, the fail-safe mode of operation is performed by setting the line pressure at a maximum value corresponding to a throttle valve fully open position. By setting the line pressure at the maximum value, it becomes possible to maintain engagement of the friction elements, such as clutches for enabling the vehicle to travel.

In the modern electronically controlled automatic power transmission, a microprocessor-based control unit performs not only line pressure control but also shift control, and lock-up control, clutch control for effecting engine braking. These controls are normally performed based on a plurality of preselected transmission control parameters, including a throttle valve open angle monitored by the throttle angle sensor. For such type of automatic power transmission, failure of the throttle angle sensor may affect not only line pressure control but also other controls, e.g. shift control, lock-up control, engine brake clutch control and so forth. Assuming that a common back-up signal as a replacement of the throttle angle signal from the throttle angle sensor is used, the back-up signal may represent the throttle valve fully open position in order to assure engagement of the clutches to drive the driving wheels. If such back-up signal is applied for shift control, it serves as a demand for swift acceleration. Therefore, the shifting pattern for shifting transmission speed ratio is set in a kick-down range pattern to set a shift-up point at a higher engine speed than that in the normal shift pattern. On the other hand, such back-up signal serves to establish a lock-up state of a lock-up clutch. On the other hand, since the back-up signal represents a full load condition on the engine, the clutch for effecting engine braking is maintained at a release state.

Such status of components of the automatic power transmission may degrade drivability of the vehicle.

SUMMARY OF THE INVENTION

Therefore, it is an object of the present invention to provide an automatic power transmission control system which can perform in a fail-safe mode of operation for various controls without causing degradation of vehicular drivability.

In order to accomplish the aforementioned and other objects, a control system for an automatic power transmission for an automotive vehicle performs line pressure control, shift control, lock-up control, engine brake clutch control, and so forth, on the basis of preselected engine control parameters including a throttle valve open angle monitored by a throttle angle sensor. The control system is designed to detect failure of the throttle angle sensor or an abnormality of the output signal of the throttle angle sensor to perform fail-safe mode of operation. In the fail-safe mode of operation, a plurality of mutually distinct back-up signals respectively, serve as replacement of the throttle angle sensor signal. Each of the back-up signals is adapted to one of line pressure control, shift control, lock-up control, and engine braking clutch control for maintaining acceptable drivability of the vehicle.

According to one aspect of the invention, a control system for an automatic power transmission for an automotive vehicle, which performs at least two mutually distinct controls of operations of the automatic power transmission on the basis of preselected control parameters, comprises:

first means for performing a first control operation on the basis of a first combination of control parameters;

second means for performing a second control operation different from the first control operation, on the basis of a second combination of control parameters including at least one common control parameter to the first combination of control parameters;

third means for detecting abnormality of the common control parameter; and fourth means, responsive to the third means detecting abnormality of the common control parameter, for generating mutually distinct back-up signals to be supplied for the first and second means as replacements faulty common control parameter.

Preferably, the fourth means generates for a back-up signals which are set at different values. For example, the common control parameter is a throttle valve open angle. The control system may further comprise fifth means for performing a third control operation different from the first and second control operations, on the basis of a third combination of control parameters including the common control parameter, and the fourth means further generates a back-up signal for the fifth means in response to the third means detecting abnormality of the common control parameter, which back-up signal for the fifth means is distinct from the back-up signals for the first and second means.

According to another aspect of the invention, a control system for an automatic power transmission for an automotive vehicle, which performs at least two mutually distinct controls of operations of the automatic power transmission on the basis of preselected control parameters, comprises:

first means for performing line pressure control for controlling working fluid pressure governing engagement and disengagement of friction elements of the automatic power transmission on the basis of a first combination of control parameters;

second means for performing shift control for shifting transmission speed ratio, on the basis of a second combination of control parameters including at least one common control parameter to the first combination of control parameters;

third means for detecting abnormality of the common control parameter; and fourth means, responsive to the third means detecting abnormality of the common control parameter, for generating mutually distinct back-up signals to be supplied for the first and second means as replacements of a faulty common control parameter.

In the preferred construction, the control system may further comprise fifth means for performing at least one of a lock-up control for controlling status of a lock-up clutch in the automatic power transmission between an engaging state and a disengaging state, and an engine braking clutch control for engaging and disengaging a clutch associated for effecting engine braking, on the basis of a third combination of control parameters including the common control parameter, and the fourth means further generates a back-up signal for the fifth means in response to the third means detecting an abnormality of the common control parameter, which back-up signal for the fifth means is distinct from the back-up signals for the first and second means.

Preferably, the back-up signal for the first means is set at a value corresponding to a throttle valve fully open position, and the back-up signal for the second means is set at a value corresponding to a half-throttle position. Furthermore, the back-up signal for the fifth means is set at a value corresponding to a throttle valve fully closed position.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
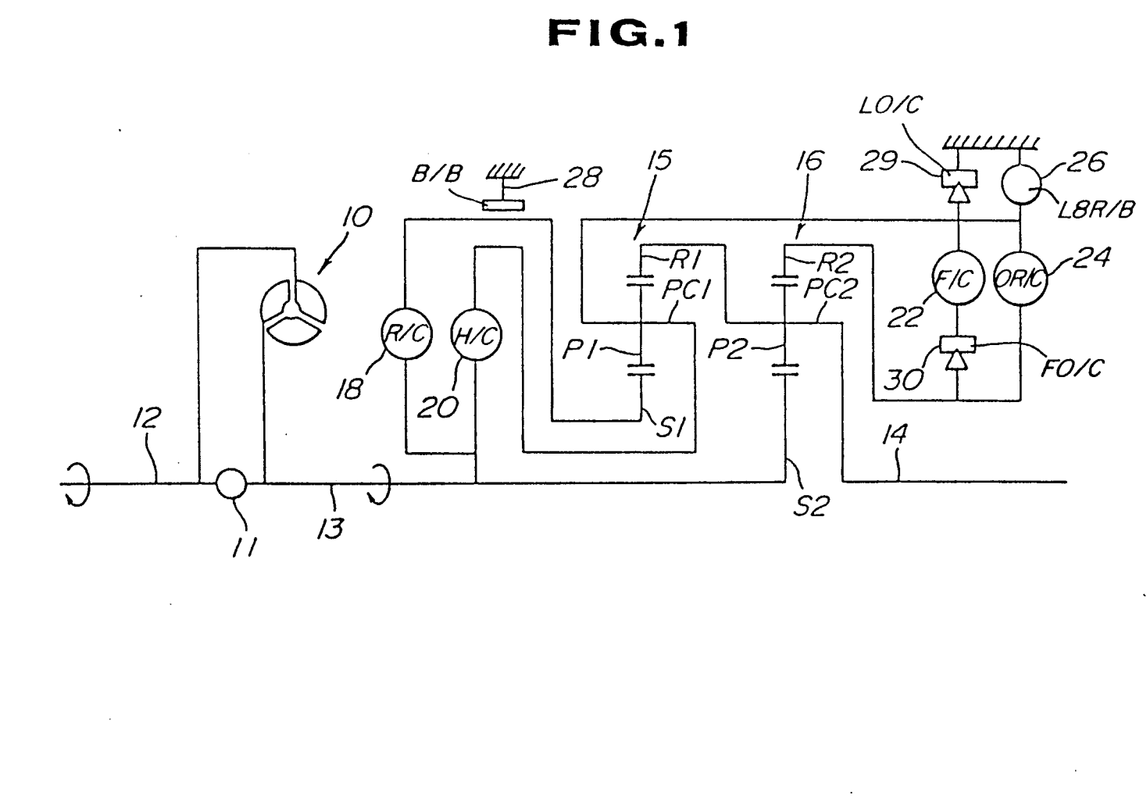
FIG. 1 is a Skeleton diagram showing an automatic power transmission for which the preferred embodiment of a pressure control system according to the present invention is applicable.

Referring now to the drawings, particularly to FIG. 1, there is shown an automatic power transmission which has a power train of four forward speed ratios and one reverse speed ratio. The power transmission mechanism includes an input or turbine shaft 13 connected to an output shaft 12 of an automotive internal combustion engine as a prime mover, via a torque converter 10. The power transmission mechanism also includes an output shaft 14 for transmitting driving torque to a final drive. The torque converter 10 has a pump impeller, a turbine runner and a stator. The pump impeller is connected to the engine output shaft. On the other hand, the turbine runner is connected to the input shaft 13. The pump impeller is also connected to an oil pump for driving the latter. Between the input shaft 13 and the output shaft 14, a first planetary gear set 15, a secondary planetary gear set 16, a reverse clutch (R/C) 18, a high clutch (H/C) 20, a forward clutch (F/C) 22, an overrun clutch (OR/C) 24, a low-and-reverse brake (L&R/B) 26, a band brake (B/B) 28, a low one-way clutch (LO/C) 29 and a forward one-way clutch (FO/C) 30. The torque converter incorporates a lock-up clutch 11. On the other hand, the first planetary gear set 15 includes a sun gear $S_1$, a ring gear $R_1$, pinions $P_1$ and a pinion carrier $PC_1$ which supports the pinions. Similarly, the second planetary gear set 16 includes a sun gear $S_2$, a ring gear $R_2$, pinions $P_2$ and a pinion carrier $PC_2$ which supports the pinions.

The pinion carrier $PC_1$ supporting the pinions $P_1$ is so designed as to be connectably associated with the input shaft 13 via the high clutch (H/C) 20. The pinion carrier $PC_1$ is also connected to the ring gear $R_2$ of the second planetary gear set 16 via a forward clutch (F/C) 22 and a forward one-way clutch (FO/C) 30 which is coupled with the forward one-way clutch in series, or in the alternative, via the forward clutch (F/C) 22 and the overrun clutch (OR/C) 24 which is provided in parallel to the forward one-way clutch (FO/C) 30. The pinion carrier $PC_1$ is adapted to be anchored by a low and reverse brake (L&R/B) 26 and its reverse rotation is prevented by the low one-way clutch (LO/C) 29. The sun gear $S_1$ of the first planetary gear set 15 is so designed as to be connectably associated with the input shaft 13 via the reverse clutch (R/C) 18. The sun gear $S_2$ of the second planetary gear set 16 is constantly connected to the input shaft 13. The ring gear $R_1$ of the first planetary gear set 15 and the pinion carrier $PC_2$ of the second planetary gear set 16 are constantly connected to the output shaft 14. The ring gear $R_1$ is integrally connected with the pinion carrier $PC_2$ of the second planetary gear set 16. The sun gear $S_2$ of the second planetary gear set 16 is connected to the input shaft 13. The ring gear $R_2$ is connectably associated with the pinion carrier $PC_1$ via the overrun clutch (OR/C) 24. In order to establish a predetermined drive relation, the forward one-way clutch (FO/C) 30 and the forward clutch (F/C) 22 are arranged between the pinion carrier $PC_1$ and the ring gear $R_2$ of the second planetary gear set 16. Engagement of the forward clutch (F/C) 22 causes the forward one-way clutch (FO/C) 30 to connect the ring gear $R_2$ with the pinion carrier $PC_1$ in the reverse rotational direction.

A low and reverse brake (L&R/B) 26 can be fixed to the pinion carrier $PC_1$. On the other hand, the band brake (B/B can be fixed to the sun gear $S_1$. A low one-way clutch (LO/C) 29 permits rotation of the pinion carrier $PC_1$ in a forward direction (i.e., The same direction as same direction to the rotating direction of the engine output shaft 12) and prevents the pinion carrier $PC_1$ from rotating in a reverse direction (opposite to the rotating direction in the forward direction).

Figure 2:
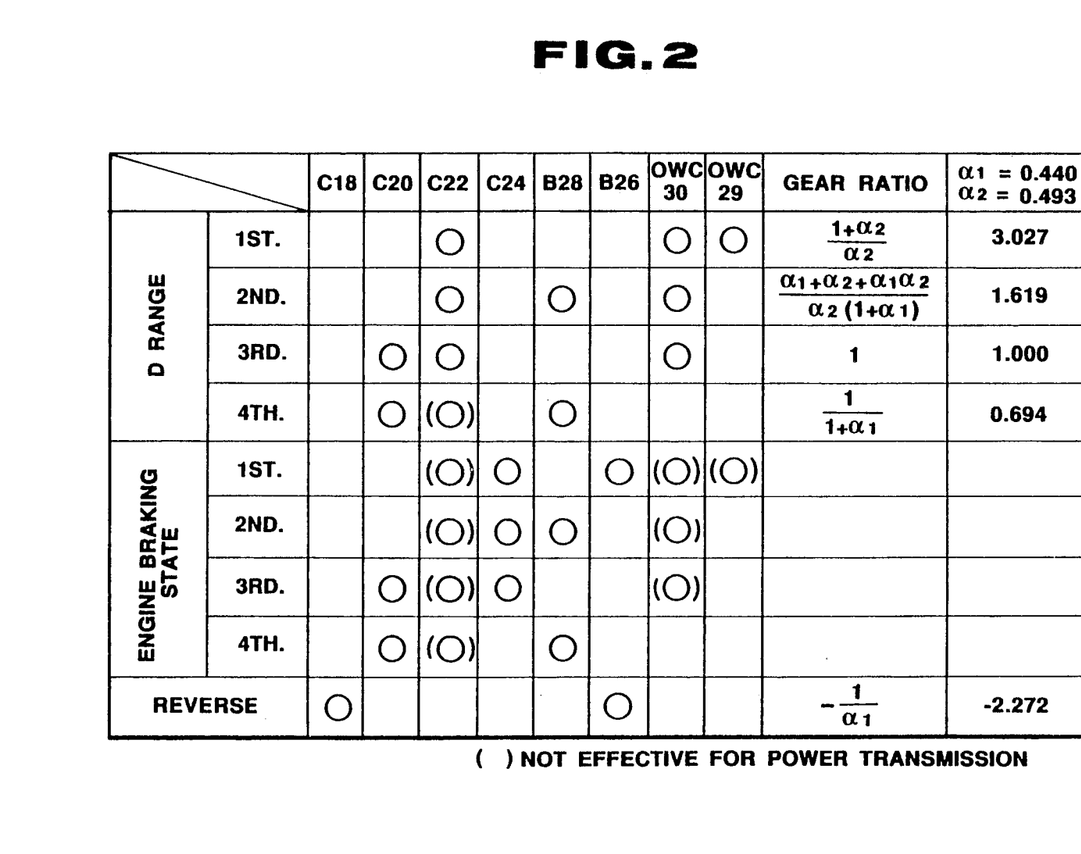
FIG. 2 is a table showing active elements in the automatic power transmission of FIG. 1 at variations in its operational range.

The power transmission mode of the power train as set forth above is selectable by a combination of the states of one or more frictional elements, i.e. the reverse clutch R/C 18, the high clutch (H/C) 20, the forward clutch (F/C) 22, the overrun clutch (OR/C) 24, the low and reverse brake (L&R/B) 26 and the band brake (B/B) 28, to establish various modes of operation of the components of the sun gears $S_1$ and $S_2$, the ring gears $R_1$ and $R_2$, and the pinion carriers $PC_1$ and $PC_2$ of the first and second planetary gear sets 15 and 16. With various modes of the first and second planetary gear sets 15 and 16, rotation speed at the output shaft 14 versus the rotation speed of the input shaft 13 is varied at various rates. Active components at respective operational modes of the transmission are illustrated by indicating (O) in respective columns in FIG. 2.

Figure 3:
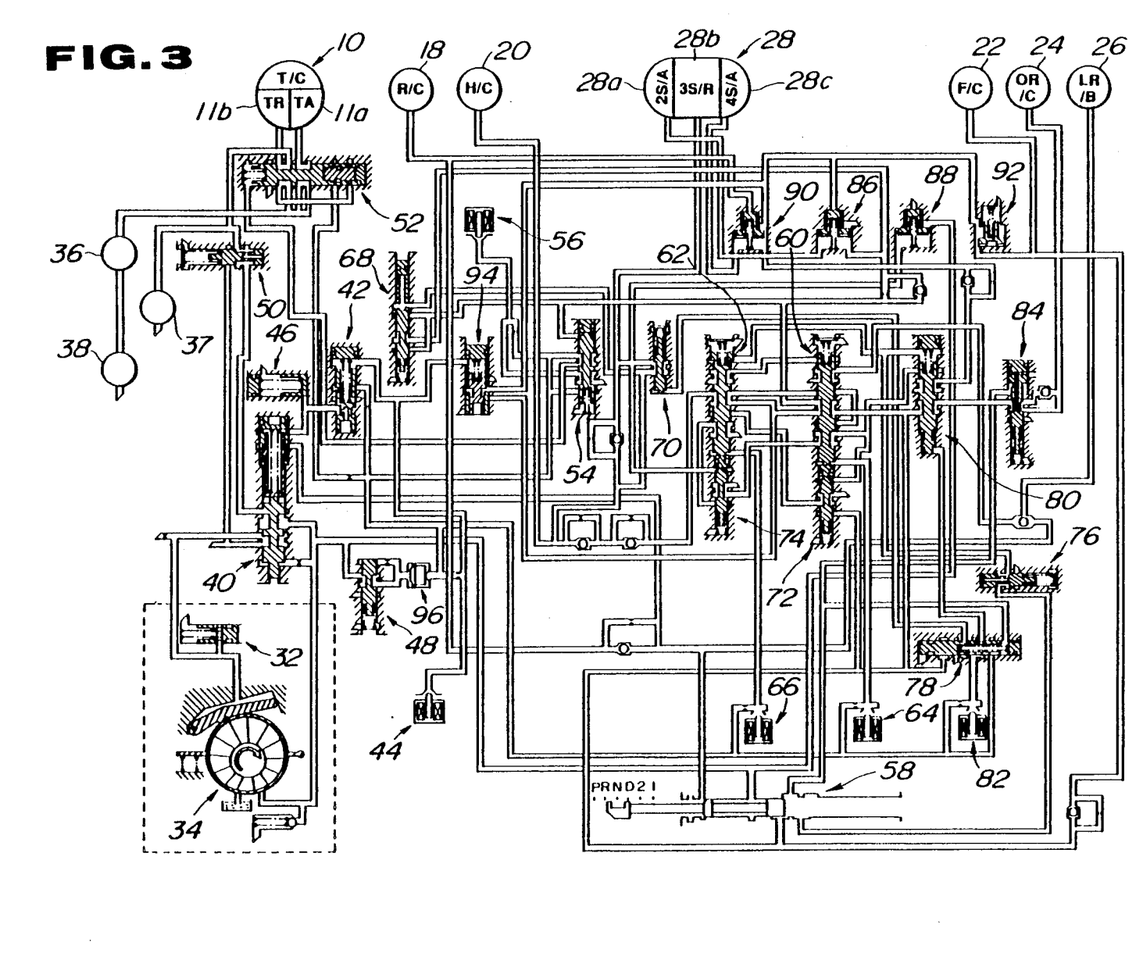
FIG. 3 is a diagram showing a preferred construction of a hydraulic circuit employed in the automatic power transmission for selecting one of a plurality of operational ranges among the ranges in FIG. 2.

In the shown construction, best seen in FIG. 3 an apply chamber 11a and a release chamber 11b are defined in the torque converter 10 in order to control the state of the lock-up clutch 11. Namely, when the fluid pressure in supplied to the release chamber 11b, the lock-up clutch 11 is released and when the fluid pressure is supplied to the apply chamber 11a, the lock-up clutch 11 is engaged for establishing a lock-up condition. The band brake (B/B) 28 defines a second speed servo apply chamber 28a, a third speed servo release chamber 28b and a fourth speed servo apply chamber 28c. With this construction, when the second speed pressure is supplied to the second servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake is applied.

FIG. 3 also illustrates a hydraulic circuit for controlling operational modes of the above-mentioned automatic power transmission. As can be seen from FIG. 3, the hydraulic circuit includes a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a fast reducing valve 76, a second shuttle valve 78, an overrunning clutch control valve 80, an overrunning clutch solenoid 82, an overrunning clutch reducing valve 84, an 1-2 accumulator 86, 2-3 accumulator 88, 3-4 accumulator 90, N-D accumulator 92, an accumulator control valve 94, a filter 96 and so forth. These components are disposed in the hydraulic circuit as shown in FIG. 3.

A variable displacement vane type oil pump 34 with a feedback accumulator 32, an oil cooler 36, a front lubricating circuit 37 and a rear lubricating circuit 38 are also provided in the hydraulic circuit.

It should be noted that the components in the hydraulic circuit set forth above are essentially the same or similar in construction and function to that in an automatic power transmission known as NISSAN Full-Range Automatic Power Transmission Type RE4R-01A. The similar hydraulic circuit with the associated components have also been disclosed in the U.S. Pat. No. 4,680,992, issued on Jul. 21, 1987 to Hayasaki et al. and in "NISSAN FULL-RANGE ELECTRONICALLY CONTROLLED AUTOMATIC TRANSMISSION SERVICE MANUAL" published by Nissan Motor Co., Ltd. on March 1987. Furthermore, Japanese Patent First (unexamined) Publication (Tokkai) Showa 62-62047 also discloses the similar construction of the hydraulic circuit for an automatic power transmission. The disclosures in the foregoing publications are herein incorporated by reference for the sake of disclosure.

Figure 4:
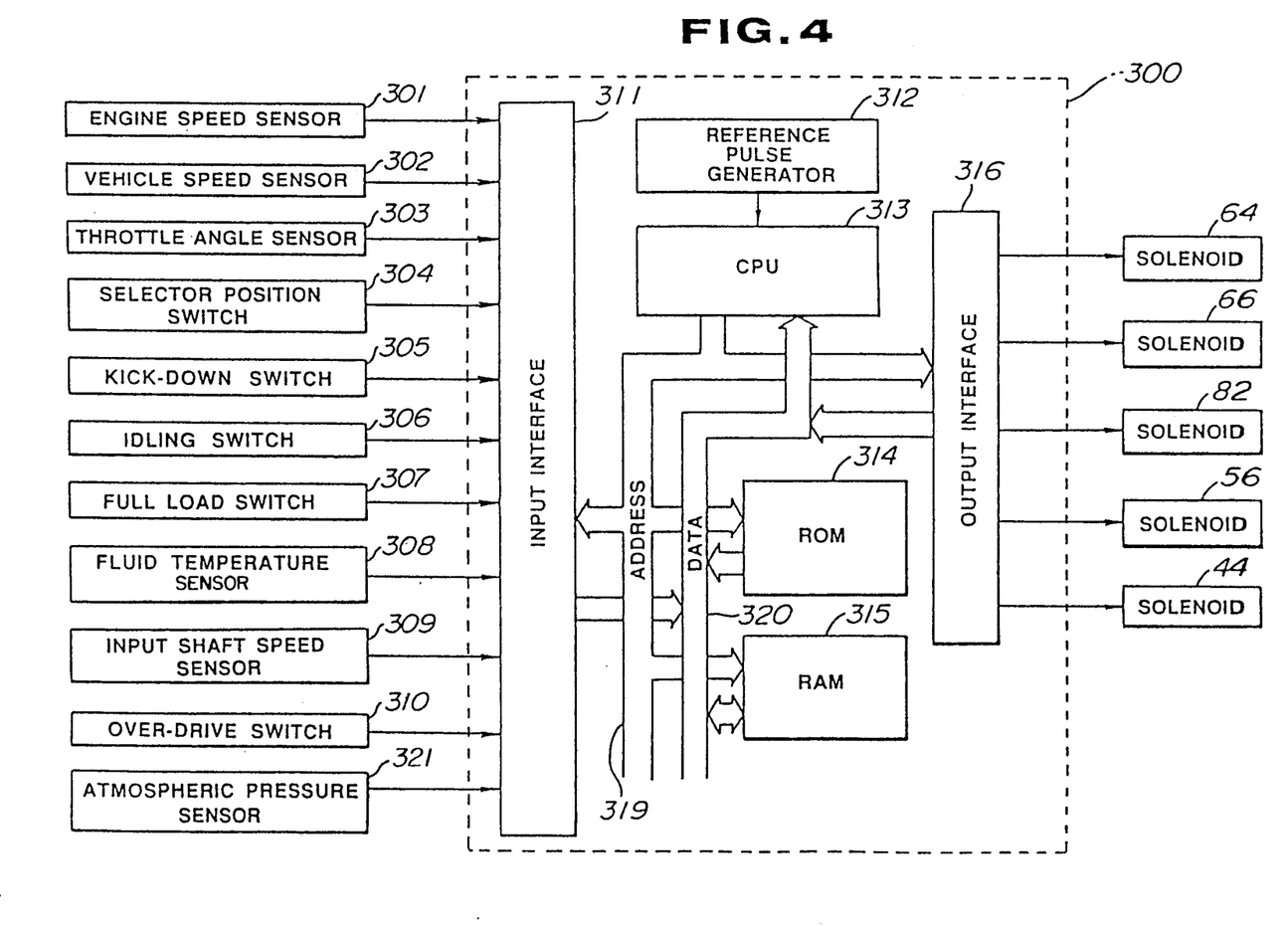
FIG. 4 is a block diagram of the preferred embodiment of a control unit designed for implementing the preferred process of fluid pressure control.

FIG. 4 is a block diagram of the preferred embodiment of a control system according to the invention. The control unit 300 is composed of a microprocessor-based data processing unit. The control unit 300 includes an input interface 311, a CPU 313, a ROM 314, a RAM 315 and an output interface 316. These components of the control unit 300 are connected through an address bus 319 and a data bus 320. In addition, the CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature sensor 308, an input shaft speed sensor 309, an over-drive switch 310 and an atmospheric pressure sensor 321 are connected to the input interface 311 of the control unit 300.

The engine speed sensor 301 may comprise a crank angle sensor monitoring crankshaft angular position to produce a crank reference signal at every predetermined angular position of the crankshaft and a crank position signal at every predetermined angular displacement of the crankshaft. The engine speed sensor 301 may further comprise an engine speed counter counting up the crank reference signals over a predetermined period for deriving an engine revolution speed to output an engine speed indicative signal N. The vehicle speed sensor 302 has a per se well known construction and thus produces a vehicle speed indicative signal V. The throttle angle sensor 303 is associated with a throttle valve in an air induction system of an internal combustion engine. The throttle angle sensor 303 minitors the throttle valve angular position and produces a throttle valve angular signal TVO. The selector position switch 304 is associated with a selector lever of the transmission to detect the selector position and thereby produces a selector position indicative signal SEL representative of the selector position. The kick-down switch 305 is associated with an accelerator pedal depression greater than a predetermined magnitude to produce a kick-down demand indicative signal.

The idle switch 306 is designed for detecting a fully closed or approximately fully closed position of the throttle valve to produce an engine idling condition indicative signal. The full load switch 307 is provided for detecting a fully open position of the throttle valve to produce a full load condition indicative signal. The fluid temperature sensor 308 monitors temperature of lubricant in the transmission to produce a fluid temperature indicative signal. The input shaft speed sensor 309 monitors rotation speed of the transmission input shaft 13 to produce an input shaft speed indicative signal. The input shaft speed sensor 309 monitors rotation speed of the transmission input shaft 13 to produce an input shaft speed indicative signal. The over-drive switch 310 is associated with the selector lever for manual operation for selecting an over-drive or a fourth speed ratio enabling state and inhibiting state for producing an over-drive enabling state indicative signal when it is enabled.

The atmospheric pressure sensor 321 monitors an atmospheric pressure to produce an atmospheric pressure indicative signal P. Though the shown embodiment employs the atmospheric pressure sensor, it may be replaced with an altitude sensor for monitoring altitude level of the vehicle as a parameter equivalent to the atmospheric pressure.

Figure 5:
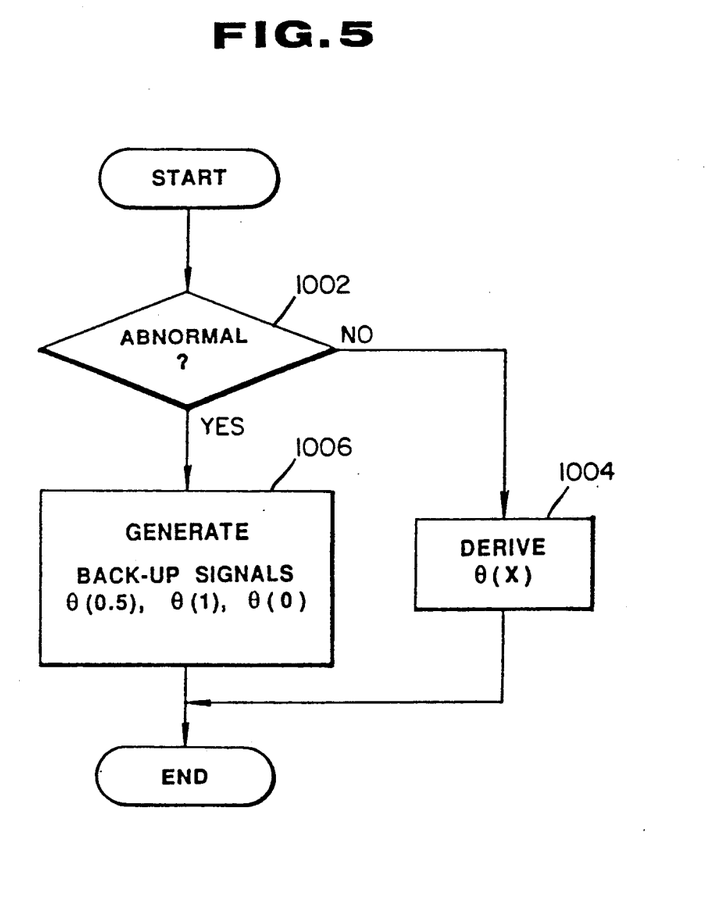
FIG. 5 is a flowchart showing a routine for a fail-safe mode of operation to be executed in response to failure of a throttle angle sensor or abnormality of the output signal of the throttle angle sensor.

Employing the sensors and switches, the control unit 300 performs various transmission control operation for optimization. FIG. 5 shows a routine of fail-safe operation which is designed to be triggered in response to failure of the throttle angle sensor 303. In practice, the abnormality or failure of the throttle angle sensor 303 is detected by monitoring the throttle angle indicative signal TVO output from the throttle angle sensor 303 and checking the value of the throttle angle indicative signal against a predetermined value range when a throttle valve medium open position detecting switch is turned ON. The manner of detection of failure has been disclosed in the aforementioned Jikkai showa 63-62656. The disclosure of the referenced prior publication is herein incorporated by reference for the sake of disclosure.

In the particular feature of the invention, the control system generates a plurality of mutually distinct back-up signals having different values to represent respectively different throttle valve angular positions for different controls, e.g. line pressure control, shift control, lock-up control, engine brake clutch control and so forth, in a fail-safe mode of operation. In practice, the back-up signal for line pressure control is set for maximum line pressure corresponding to the throttle valve fully open position. The back-up signal value corresponding to the throttle valve fully open position will be labeled as "$\theta(1)$". On the other hand, the back-up signal for shift control is set at a value corresponding to a half-throttle position, in which the throttle valve open angle is set at 50% as labeled "$\theta(0.5)$". Furthermore, for lock-up control and engine braking clutch control, the back-up signal value is set at a value corresponding to the throttle valve fully closed position as labeled "$\theta(0)$".

In the practical operation as shown in FIG. 5, at a step 1002, the throttle angle sensor 303 is checked. When the throttle angle sensor 303 operates in a normal state as checked at the step 1002, the throttle valve open angle data $\theta_x$ is derived on the basis of the throttle angle indicative signal TVO output from the throttle angle sensor 303, at a step 1004. In such case, line pressure control, shift control, lock-up control and engine braking clutch control are performed based on the throttle value open angle data $\theta_x$ derived at the step 1004. If failure of the throttle angle sensor 303 is detected, a fail-safe mode of operation is initiated at a step 1006. In the fail-safe mode of operation, the back-up signals for line pressure control, shift control, lock-up control and engine braking clutch control are generated. In such case, respective ones of the controls are performed on the basis of respectively corresponding back-up signal values.

By setting different values of back-up signals for different controls, a fail-safe mode of operation for respective of the controls for the automatic power transmission can be performed without causing substantial degradation of the vehicular drivability.

Therefore, the invention fulfills all of the objects and advantages sought therefor.

While the present invention has been discussed hereabove in terms of the preferred embodiment of the invention, the invention should be appreciated to be restricted for the shown embodiment. The invention can be embodied in various fashion. Therefore, the invention should be interpreted to include all possible embodiments and modifications which can be embodied without departing from the principle of the invention set out in the appended claims.

What is claimed is:

1. A control system for an automatic power transmission for an automotive vehicle, which performs at least two mutually distinct control operations of said automatic power transmission on the basis of preselected control parameters, comprising:

first means for performing a first control operation on the basis of a first combination of control parameters;

second means for performing a second control operation different from said first control operation, on the basis of a second combination of control parameters including at least one common control parameter to said first combination of control parameters;

third means for detecting abnormality of said common control parameter to provide a signal indicative thereof; and fourth means responsive to the signal from said third means for providing preselected first and second back-up signals which have values different from each other to be supplied to said first and second means as replacements for the faulty common control parameter.

2. A control system as set forth in claim 1, wherein said common control parameter is a throttle valve open angle.

3. A control system for an automatic power transmission for an automotive vehicle, which performs at least two mutually distinct control operations of said automatic power transmission on the basis of preselected control parameters, comprising:

first means for performing a first control operation on the basis of a first combination of control parameters;

second means for performing a second control operation different from said first control operation, on the basis of a second combination of control parameters including at least one common control parameter to said first combination of control parameters;

third means for detecting abnormality of said common control parameter to provide a signal indicative thereof;

fourth means responsive to the signal from said third means for providing preselected first and second back-up signals which have values different from each other to be supplied to said first and second means as replacements for the faulty common control parameter; and fifth means for performing a third control operation different from said first and second control operations, on the basis of a third combination of control parameters including said common control parameter, and said fourth means further generates a back-up signal for said fifth means in response to said third means detecting abnormality of said common control parameter, which back-up signal for said fifth means is distinct from said back-up signals for said first and second means.

4. A control system for an automatic power transmission for an automotive vehicle, which performs at least two mutually distinct control of operations of said automatic power transmission on the basis of preselected control parameters, comprising:

first means for performing line pressure control for controlling working fluid pressure governing engagement and disengagement of friction elements of said automatic power transmission on the basis of a first combination of control parameters;

second means for performing shift control for shifting transmission speed ratio, on the basis of a second combination of control parameters including at least one common control parameter to said first combination of control parameters;

third means for detecting abnormality of said common control parameter; and fourth means, responsive to said third means detecting abnormality of said common control parameter, for generating back-up signals which have values different from each other to be supplied to said first and second means as replacements for the faulty common control parameter.

5. A control system as set forth in claim 4, wherein said common control parameter is a throttle valve open angle.

6. A control system as set forth in claim 4, wherein said back-up signal for said first means is set at a value corresponding to a throttle valve fully open position, and said back-up signal for said second means is set at a value corresponding to a half-throttle position.

7. A control system as set forth in claim 4, which further comprises fifth means for performing at least one of lock-up control for controlling status of a lock-up clutch in said automatic power transmission between engaging state and disengaging state, and an engine braking clutch control for engaging and disengaging a clutch associated for effecting engine braking, on the basis of a third combination of control parameters including said common control parameter, and said fourth means further generates a back-up signal for said fifth means in response to said third means detecting abnormality of said common control parameter, which back-up signal for said fifth means is set at a value corresponding to a throttle valve fully closed position.

8. A control system for an automatic power transmission for an automotive vehicle, which performs at least two mutually distinct control of operations of said automatic power transmission on the basis of preselected control parameters, comprising:

first means for performing line pressure control for controlling working fluid pressure governing engagement and disengagement of friction elements of said automatic power transmission on the basis of a first combination of control parameters;

second means for performing shift control for shifting transmission speed ratio, on the basis of a second combination of control parameters including at least one common control parameter to said first combination of control parameters;

third means for detecting abnormality of said common control parameter;

fourth means, responsive to said third means detecting abnormality of said common control parameter, for generating back-up signals which have values different from each other to be supplied to said first and second means as replacements for the faulty common control parameter; and fifth means for performing at least one of lock-up control for controlling status of a lock-up clutch in said automatic power transmission between engaging state and disengaging state, and an engine braking clutch control for engaging and disengaging a clutch associated for effecting engine braking, on the basis of a third combination of control parameters including said common control parameter, and said fourth means further generates a back-up signal for said fifth means in response to said third means detecting abnormality of said common control parameter, which back-up signal for said fifth means is distinct from said back-up signals for said first and second means.

9. A control system as set forth in claim 8, wherein said back-up signal for said first means is set at a value corresponding to a throttle valve fully open position, and said back-up signal for said second means is set at a value corresponding to a half-throttle position.

10. A control system as set forth in claim 8, which further comprises fifth means for performing at least one of lock-up control for controlling status of a lock-up clutch in said automatic power transmission between engaging state and disengaging state, and an engine braking clutch control for engaging and disengaging a clutch associated for effecting engine braking, on the basis of a third combination of control parameters including said common control parameter, and said fourth means further generates a back-up signal for said fifth means in response to said third means detecting abnormality of said common control parameter, which back-up signal for said fifth means is set at a value corresponding to a throttle valve fully closed position.

* * * * *